(12) United States Patent
Dirauf et al.

(10) Patent No.: US 8,833,170 B2
(45) Date of Patent: Sep. 16, 2014

(54) APPARATUS AND METHOD FOR POSITION DETERMINATION

(75) Inventors: Franz Dirauf, Ebensfeld (DE); Hendrik Faustmann, Coburg (DE); Gerhard Lindner, Coburg (DE); Michael Muench, Coburg (DE)

(73) Assignee: Siemens Aktiengesellschaft, München (DE)

( * ) Notice: Subject to any disclaimer, the term of this patent is extended or adjusted under 35 U.S.C. 154(b) by 795 days.

(21) Appl. No.: 12/775,167

(22) Filed: May 6, 2010

(65) Prior Publication Data

US 2010/0281983 A1 Nov. 11, 2010

(30) Foreign Application Priority Data

May 11, 2009 (DE) .......................... 10 2009 020 676

(51) Int. Cl.
*G01B 17/00* (2006.01)
*G21K 1/04* (2006.01)
*G01S 15/08* (2006.01)

(52) U.S. Cl.
CPC ................ *G01B 17/00* (2013.10); *G21K 1/046* (2013.01); *G01S 15/08* (2013.01)
USPC .......................................................... 73/627

(58) Field of Classification Search
USPC .......................................................... 73/627
See application file for complete search history.

(56) References Cited

U.S. PATENT DOCUMENTS

| | | | |
|---|---|---|---|
| 3,653,031 A | 3/1972 | Hlady et al. | |
| 3,665,225 A | 5/1972 | van den Heuvel et al. | |
| 4,330,728 A | 5/1982 | Solie | |
| 5,841,214 A | 11/1998 | Schmidt et al. | |
| 6,088,641 A * | 7/2000 | Bushmann et al. | ............. 701/49 |
| 6,155,117 A | 12/2000 | Stevens et al. | |
| 6,318,524 B1 | 11/2001 | Lutz et al. | |
| 6,513,365 B1 | 2/2003 | Bruetting et al. | |
| 6,744,724 B2 | 6/2004 | Nagata et al. | |
| 2006/0072849 A1 * | 4/2006 | Marc | ............................ 382/291 |
| 2009/0010395 A1 | 1/2009 | Ein-Gal | |

FOREIGN PATENT DOCUMENTS

| | | |
|---|---|---|
| CN | 1141675 A | 1/1997 |
| CN | 1196116 A | 10/1998 |
| DE | 44 05 647 A1 | 8/1995 |
| EP | 0988538 B1 | 3/2000 |
| EP | 0 914 643 B1 | 10/2003 |
| GB | 2 152 667 A | 8/1985 |

(Continued)

OTHER PUBLICATIONS

German Office Action dated Jan. 18, 2010 for corresponding German Patent Application No. DE 10 2009 020 676.0 with English translation.

Prof. Dr. G. Lindner et al., "Messung von Flüssigkeitseigenschaften mit einem flexible konfigurierbaren akustischen Wellenleiter-Sensor," in Tagunsband Sensoren and Messystems 2006: 13. ITG/GMA—Fachtagung, Mar. 13-14, 2008, pp. 269-273, and English translation.

(Continued)

*Primary Examiner* — Hezron E Williams
*Assistant Examiner* — Gregory J Redmann
(74) *Attorney, Agent, or Firm* — Lempia Summerfield Katz LLC

(57) ABSTRACT

An apparatus for determining a distance includes a converter element that generates n acoustic surface wave, a surface that feeds over at least part of the acoustic surface wave to a surface having a reflection point, and a processor that determines a distance between the apparatus and the reflection point from the propagation time of the acoustic surface wave. The converter element registers the acoustic surface wave reflected at the reflection point.

17 Claims, 4 Drawing Sheets

(56) References Cited

FOREIGN PATENT DOCUMENTS

| | | |
|---|---|---|
| GB | 2 206 965 A | 1/1989 |
| JP | 3146810 A | 6/1991 |
| JP | 2005 121498 A | 5/2005 |
| WO | WO 00/26658 A1 | 5/2000 |
| WO | WO 2004/015383 A1 | 2/2004 |

OTHER PUBLICATIONS

UK Combined Search and Examination Report under Sections 17 and 18(3) dated Sep. 1, 2010 for corresponding GB Patent Application No. 1006693.4.

Chinese Office Action dated Apr. 28, 2013 for corresponding Chinese Patent Application No. 201010178006.X with English translation.

* cited by examiner

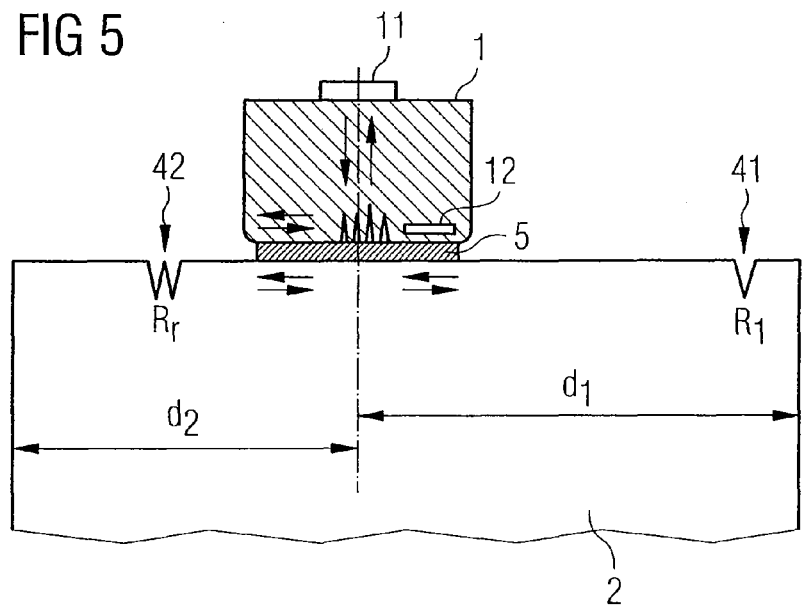
FIG 5
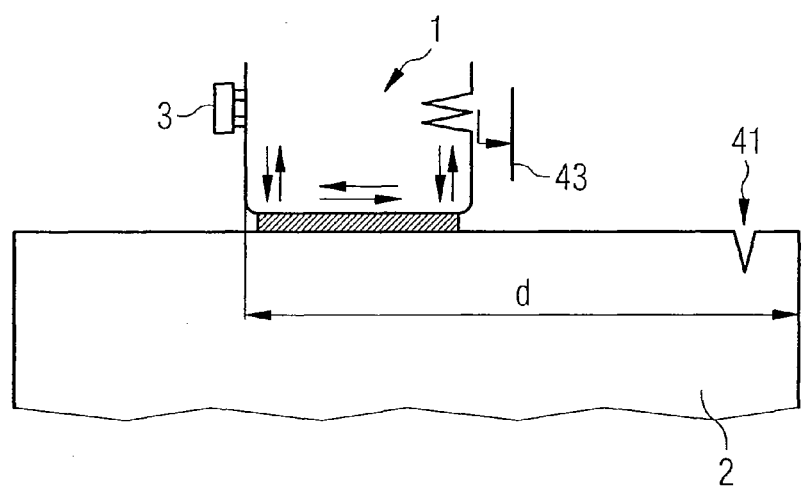
FIG 6
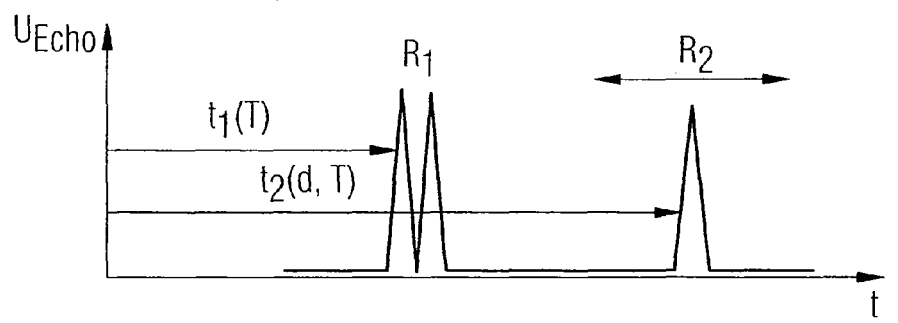

APPARATUS AND METHOD FOR POSITION DETERMINATION

This application claims the benefit of DE 10 2009 020 676.0 filed May 11, 2009, which is hereby incorporated by reference.

BACKGROUND

The present embodiments relate to an apparatus and method for determining a distance.

The determination of position information of objects of variable position plays an important role in wide areas of technology. Perhaps the simplest method for determining the position of an object is to dispose a transmitter on the object, the position of the transmitter being located on the basis of transmitted signals. There are also measuring methods, for example, which operate on the basis of a measuring device for measuring a distance in a contactless manner with the aid of an infrared detector or an ultrasonic detector. However, the application of such solutions is not favorable in many areas, as such solutions are associated with too high an outlay. Also, these methods are associated with measures that are disadvantageous with respect to the object the position of which is to be determined (e.g., the radiation emitted by a transmitter used for position determination may be undesirable).

One example of a technical apparatus that requires position determination that is subject to certain basic conditions is the determination of the position of leaves of a multileaf collimator in medical engineering. Multileaf collimators are generally used in radiation devices for tumor therapy. The multileaf collimator is used to narrow down the beam profile of the radiation device so that the body region to be irradiated is encompassed by the therapy beam in a manner that corresponds as closely as possible to the form of the body region. To tailor the form of the beam profile to the region to be irradiated, collimators generally consist of individual, thin (e.g., 2 to 4 mm thick) leaves made of a material with a high absorption capacity for x-ray and gamma radiation. The leaves are disposed parallel to the radiation direction and can be displaced independently of one another in a plane perpendicular to the radiation direction. Each leaf is supported in a fixed guideway and provided with a corresponding actuator.

It must be possible for the position of each leaf to be measured independently of the actuator at short time intervals compared with the radiation period in order to be able to check the correspondence of the leaf positions to treatment requirements. It would be complex and possibly disruptive to position sensors or other measuring apparatuses, and in some instances, associated cable connections, on the movable leaves.

A method for determining the position of leaves in a multileaf collimator is specified, for example, in US 2006/0072849 A1. It is proposed here to use the projection of light emitted onto the multileaf collimator for position determination purposes. This procedure uses an additional light source and is comparatively complex with respect to the conversion of the light projection to quantitative information, which can be used, for example, to control the actuators of the collimator.

In US 2009/0010395 A1, it is proposed to carry out position determination for a multileaf collimator using a camera, which records the multileaf collimator. The recorded image is then used to determine position information. This solution requires an additional camera and is likewise complex with respect to the conversion of the recorded image to position information for the individual leaves of a multileaf collimator.

SUMMARY AND DESCRIPTION

The present embodiments may obviate one or more of the drawbacks or limitations in the related art. For example, in one embodiment, the position of leaves of a multileaf collimator may be determined.

In the present embodiments, acoustic surface waves may be used for distance and/or position determination. In one embodiment, the acoustic surface waves are Rayleigh waves or waves in the transition region between Rayleigh waves and Lamb waves. An acoustic surface wave is generated using an apparatus, and the acoustic surface wave is fed over to a surface. The acoustic surface wave passes on the surface to a reflection point, from which the acoustic surface wave is reflected back to the apparatus and is registered or detected by the apparatus. The distance between the apparatus and the reflection point is determined from the propagation time of the acoustic surface wave. The distance between the apparatus and the reflection point may be defined as the distance between a marked point (e.g., an edge point), at which the apparatus feeds the surface wave over to the surface, and the reflection point. The reflection point may be realized, for example, by a notch. If the reflection point occupies a known position on the surface, the position of other marked points on the surface may be determined from the distance from the reflection point. In one embodiment, the position of an end of the surface may be determined.

A surface wave may be an acoustic surface wave in the form of a spatially defined and temporally variable excitation of the surface that is suitable for propagation in a propagation direction along the surface. With respect to the spatially defined excitation, the dimensions of the waves are such that they are suitable for measurements. The possibility of using surface waves for measurements is set out in EP 0988538 B1 (See sections [0017] and [0018] for additional information relating to comparable waves).

In the present embodiments, a flexible and uncomplicated manner of carrying out position determinations is provided. The position of leaves of a multileaf collimator, the leaves being provided with at least one reflection point each, may be determined. Leaves of a multileaf collimator are typically moved in a single direction by the respective actuator. With the present embodiments, a number of items of position information assigned to a surface may be determined using surface waves emitted in correspondingly different directions. The present embodiments are not limited to the area of medical engineering (e.g., multileaf collimators). The present embodiments are also suitable for position measurements in other medical devices such as, for example, patient tables, x-ray stands, and diagnostic diaphragms. A wide range of applications outside medical engineering are also possible. Generally, the present embodiments may be used when a position is to be determined by way of a surface. The present embodiments may also be used for surfaces that are not flat; the surface waves follow curved surfaces, so there is a high level of freedom of configuration compared with other measuring methods that may only be used in a straight line (e.g., optical methods). The present embodiments measure the position in an absolute manner after activation and do not use the referencing that is necessary with relative measuring methods. This feature contributes significantly to the low level of complexity.

An electromechanical converter element (e.g., a piezoelectric interdigital converter) may be provided to generate the surface wave. Such a converter is shown, for example, in FIG. 2 of WO 00/26658 for use with another measuring method.

In one embodiment, the surface wave is generated by generating a volume sound wave (e.g., using a piezoelectric thickness mode transducer) and converting the volume sound wave to a surface wave using mode conversion.

In one embodiment, the apparatus used to generate the surface wave includes a surface for feedover of the surface wave to the surface with the reflection point. The surface of the apparatus is configured for feedover (e.g., for direct contact or contact by way of a lubricant). The surface of the apparatus may have curvature so that the surface of the apparatus may be better tailored to a non-flat examination surface. In one embodiment, the surface of the apparatus may be provided with a coupling element (e.g., a grease).

In one embodiment, a plurality of adjacent reflection points are provided, together producing a reflection pattern, which may be used by the apparatus to identify the reflection point. The distance between the plurality of adjacent reflection points is small compared with the path covered by the reflected wave or the dimensions of the surface in the examined direction. By evaluating the plurality of successive reflections and stipulating unique reflection patterns, the received reflected surface waves are assigned correctly, even when a plurality of position determinations are carried out in parallel or if unwanted reflections are present.

The present embodiments have advantages when used in a constellation where the examined surface changes position in relation to the apparatus generating the acoustic surface wave (generally, the apparatus will be fixed and the surface will be on a moving object). Such a situation exists, for example, with a multileaf collimator, where individual leaves are repeatedly adjusted or moved as a function of the examinations carried out. With respect to a multileaf collimator and similarly structured objects, the apparatus may be configured such that a surface wave may be decoupled to a plurality of objects (e.g., leaves), and the position determinations may be carried out almost simultaneously for the plurality of objects. In one embodiment, the reflection patterns discussed above are used in such a constellation to differentiate the reflections of the different objects. The surface wave may be decoupled, for example, to the plurality of objects by disposing a plurality of wave splitters behind one another in the apparatus. Each of the plurality of wave splitters decouples part of the surface wave traveling in the direction of wave splitters to an object and allows another part of the surface wave to pass or be transmitted for the next decoupling.

The propagation speed of a surface wave, and therefore, the determined position, may be a function of external influences such as, for example, temperature or air pressure. A type of calibration may be carried out by measuring the propagation speed of the surface wave for a known path. According to the present embodiments, such a determination is already provided. In one embodiment, a path, along which a surface wave passes and from which the speed of the surface wave may be determined using the known length of the path, is provided within the apparatus. For the sake of simplicity, a reflection point may be provided in the apparatus to reflect the surface wave within the apparatus. In one embodiment, a known path on the surface may be used for such a speed determination. Two waves are reflected on the surface at different reflection points, and the distance between the reflection points is known. Both reflection points may be located, for example, on different sides in relation to the apparatus.

The speed and position determinations made by the apparatus may be realized using software, hardware (e.g., a processor, a memory), firmware or a combination thereof.

BRIEF DESCRIPTION OF THE DRAWINGS

FIG. 5 shows one embodiment of the apparatus for position determination that generates a surface wave by mode conversion of a volume sound wave;

FIG. 6 shows one embodiment of the apparatus for position determination for obtaining a reference signal;

DETAILED DESCRIPTION OF THE DRAWINGS

Figure 1:
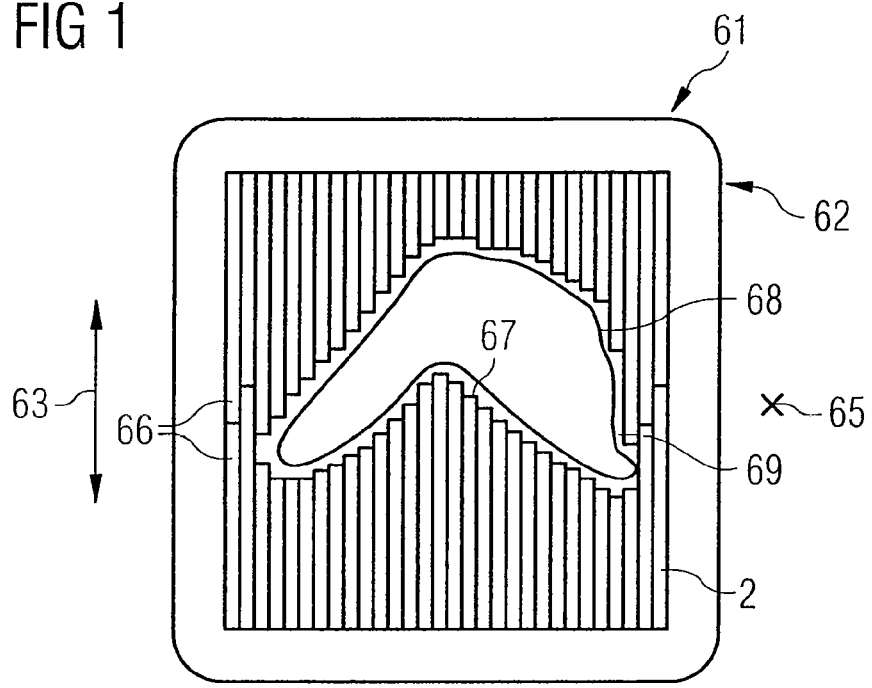
FIG. 1 shows a multileaf collimator in a plane perpendicular to the radiation direction.
Figure 2:
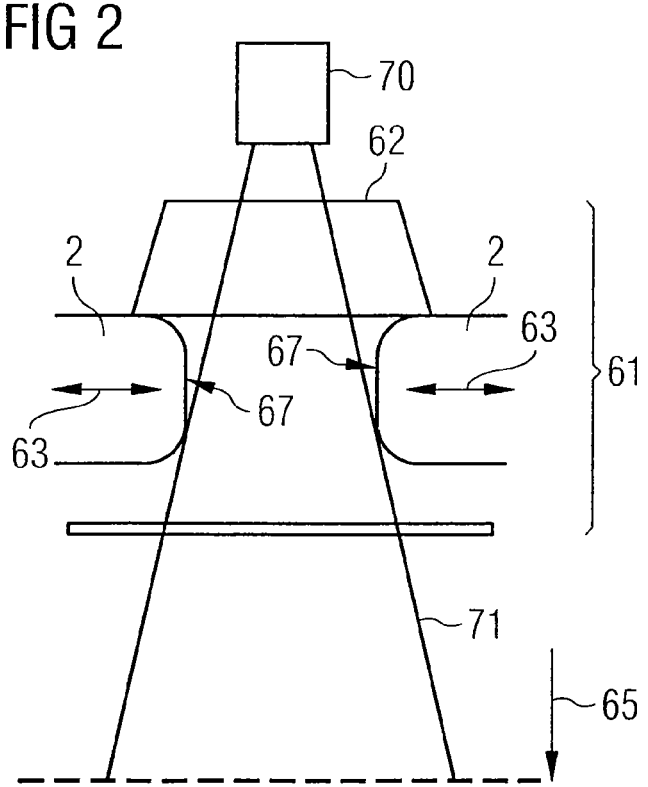
FIG. 2 shows a side view of a radiation source with a multileaf collimator.

FIG. 1 shows a top view of a multileaf collimator 61. The multileaf collimator 61 has a housing 62 and leaves 2 that may be adjusted along a displacement direction 63 using an adjustment mechanism. The adjustment mechanism is housed in the housing 62. As shown in FIG. 2, the leaves 2 absorb beams 71 from a radiation source 70. The radiation direction 65 is directed in a perpendicular manner into the plane of the image. The leaves 2 may be adjusted in counter directions toward one another up to a closed position 66, in which the distance between front faces 67 of the leaves 2 is minimal. By adjusting the leaves 2, an opening for the beams 71 passing through the multileaf collimator 61 in the radiation direction 65 may be predefined such that the cross section of the beams 71 passing through corresponds to a predefined radiation region 68 apart from edge zones 69.

Figure 3:
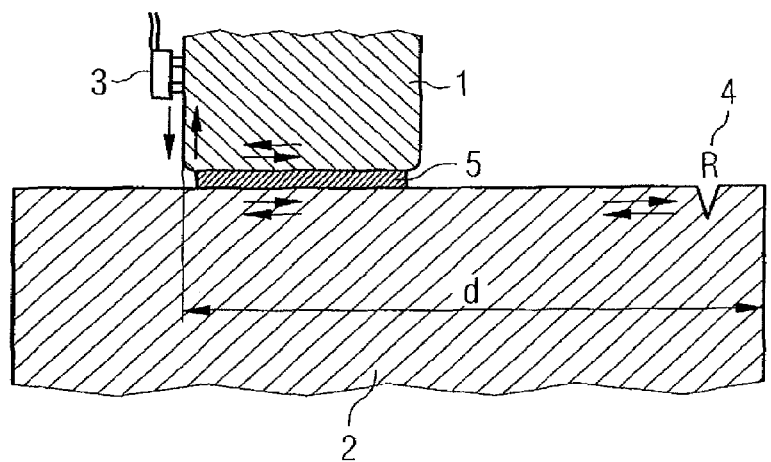
FIG. 3 shows one embodiment of an apparatus for position determination.

FIG. 3 shows a part of a leaf 2 of a multileaf collimator. The leaf 2 is in contact with one embodiment of an apparatus 1 for generating surface waves. The apparatus 1 is also referred to below as a fixed sliding apparatus because the apparatus 1 is fixed but also allows the leaf 2 to slide along the apparatus 1 so that the coupling or contact required to feed over a surface wave remains present. A sliding element 5 is provided between the leaf 2 and the apparatus 1 and also serves as a coupling element. Surface waves are generated using an electromechanical converter element 3 with a cable connection (e.g. a piezoelectric digital converter or transponder 3). The converter element 3 generates an acoustic surface wave (e.g., a Rayleigh wave or a wave in the transition region between Rayleigh waves and Lamb waves). With reference to FIG. 1, the acoustic surface wave moves first in the direction of the surface and is then fed over to the surface. The acoustic surface wave passes in the direction of a reflection point 4 provided on a surface of the leaf 2, is reflected and passes back along the same path to the electromechanical converter element or transponder 3. The converter element 3 registers or detects the reflected wave.

Since the distance between the reflection point 4 and the end of the leaf is known, the distance d between the apparatus and the end of the leaf may be calculated from the propagation time. This distance between the apparatus and the end of the leaf changes, depending on the setting of the leaf for the respective treatment.

The acoustic surface wave fed over in this manner to the moving narrow side of the leaf is thus conducted on the surface to a reflection point positioned in a fixed manner in the leaf 2 (e.g., a notch), from which the reflected surface wave is reflected back in the same manner to the electromechanical converter. The position of the leaf 2 may be determined from the location of the reflection point relative to the fixed sliding apparatus by measuring the propagation time of a short surface wave pulse between the time of generation of the short surface wave pulse in the electromechanical converter element and the arrival time of the echo pulse returning from the reflection point.

It is shown by arrows that the generated surface wave may also be transmitted within the apparatus, which, as shown and described in more detail in FIG. 6, may be used to calculate the wave propagation speed.

Figure 4:
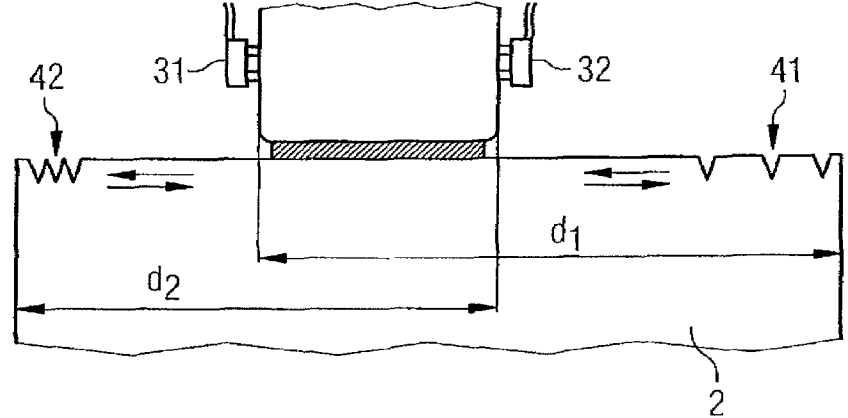
FIG. 4 shows the use of reflection patterns with one embodiment of the apparatus for position determination.
Figure 4:
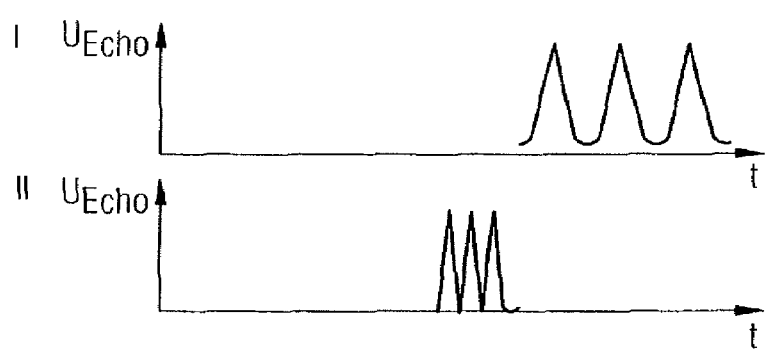

FIG. 4 shows one embodiment of the apparatus 1, which is configured to measure distance in two directions. The apparatus includes two converter elements 31 and 32, each generating sound waves for counter directions. The converter element 31 is used to generate a sound wave that passes toward three notches 41 on a right side of the leaf 2. The sound wave is reflected at the three notches 41 and is registered by the converter element 31 again. The converter element 32 is used to measure distance in the counter direction. The converter element 32 is used to generate a surface wave that passes to the left in FIG. 4. The surface wave is reflected by three notches 42 and is registered by the converter element 32. The events measured by the converter elements 31 and 32 are shown on a time scale at the bottom of FIG. 4. In the case of the converter element 31, the registration of events is later than for the converter element 32, which corresponds to the longer length of the distance d1 compared with d2. The three notches 41 are further apart than the three notches 42, which is reflected in the interval between the measured events at the bottom of FIG. 4. This embodiment has at least two advantages: the different reflection patterns generated by using multiple reflection points result in the ability to uniquely assign events to a reflection, and two distances (e.g., d1 and d2) may be determined. From the known dimensions of the leaf together with the known dimensions of the apparatus 1, the speed of the surface waves may be determined by evaluating the time period for the reflections. The distance between the two reflection points or between two ends of the leaf 2 serves as a reference variable.

FIG. 5 shows one embodiment of the apparatus 1. In this embodiment, surface waves are not generated by a converter element but by an alternative method. The apparatus 1 includes a piezoelectric thickness mode transducer 11, which is used to generate a volume sound wave. Surface waves are generated at the transition point between the apparatus 1 and the sliding element 5 using a mode conversion structure 12, which consists of, for example, a suitable periodic structuring of the surface (e.g., using a notch arrangement) and fed over to the leaf 2. This conversion using mode conversion is reversible, so that the reflected surface waves may be converted back to (e.g., longitudinal or transverse) volume sound waves and may be registered by the piezoelectric thickness mode transducer 11. Reflecting notches 41 and 42 (e.g., each including one or two notches) are positioned, as described above, on both sides of the apparatus 1 so that the number of events makes up the reflection pattern rather than the interval between events. The piezoelectric thickness mode transducer 11 may be used in the manner described above to determine the distances d1 and d2. The propagation speed of the surface wave may be calculated from the known overall dimensions of the leaf 2.

FIG. 6 shows one embodiment of the apparatus 1 that uses a different procedure for determining surface speed. In this embodiment, a converter element 3 generates a surface wave, which continues to move within the apparatus 1 and is reflected back at the reflection point 43. The surface speed may be determined from the known distance between the converter element 3 and the reflection point 43 (e.g., including two notches). The surface wave is fed over to the surface of the leaf 2 and is transmitted back to the converter element 3 after being reflected at the reflection point 41 (e.g., having one notch). The reflection points 41 and 43 have a different number of notches (e.g., at least one multiple reflection point is used) so that during simultaneous implementation, events registered by the converter 3 may be uniquely assigned. This becomes even clearer from the time curve shown at the bottom of FIG. 6, showing the events registered by the converter 3. After a first time t1, the reflection pattern associated with the reflection point 43 is detected; at a later time t2, the reflection pattern of the reflection point 41 is detected. While the time period t2 is a function of the length d to be calculated, the path for t1 is known and can be used to calculate the speed of the surface wave, from which together with the time t2, the distance d is obtained.

In one variant of the arrangement in FIG. 6, a signal is used for both measurements (e.g., reference measurement and distance measurement). This can be carried out using, for example, a notch or a splitter, which decouples part of the signal used for the reference measurement to the leaf 2. The mode of action is described in more detail in the description relating to FIG. 7, where this concept is extended for a number of leaves.

Figure 7:
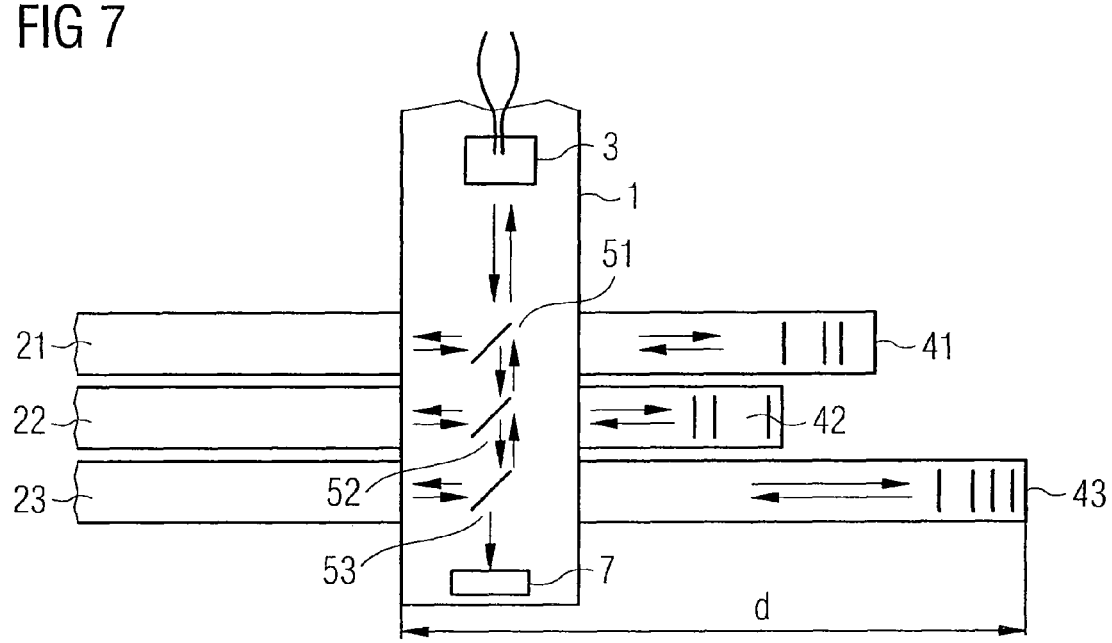
FIG. 7 shows one embodiment of the apparatus for position determination for decoupling a surface wave on a plurality of leaves.
Figure 7:
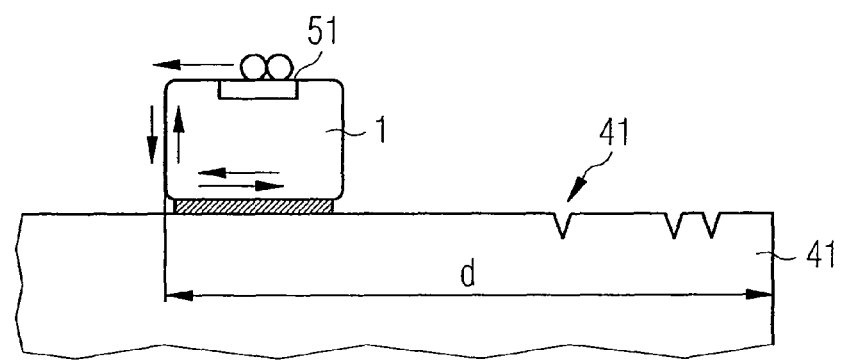

FIG. 7 shows two different views of one embodiment of the apparatus 1. The apparatus 1 includes an element 3 to generate a surface wave used for a plurality of leaves 21, 22, 23. The apparatus 1 includes wave splitters 51, 52, 53 (e.g., partially reflecting notches), which split the wave to the plurality of leaves 21, 22, 23, so that the positions of the plurality of leaves 21, 22, 23 may be determined at the same time. The surface wave generated by the converter 3 passes first to the splitter or notch 51, which diverts part of the wave at an angle of approximately 45° for the position measurement at the leaf 21. The remainder of the wave passes on to the splitter 52, where part of the wave is diverted for the position measurement at the leaf 22. A third leaf 23 is also shown, for which a wave is diverted at the splitter 53. The part of the wave allowed to pass by the splitter 53 is removed in a sink or clamper 7. The lower part of FIG. 7 shows the pattern of the wave after splitting at the leaf 21 in the perspective of FIGS. 3 to 6. As in FIG. 3, the surface wave or surface wave component is fed over to the leaf 21 and reflected back by a multiple reflection point 41 with a specific reflection pattern. The remaining path is reversible relative to the previously covered path. (i.e., the splitter 51 brings about a return to the converter element 3). The converter element 3 registers the reflections of all of the plurality of leaves 21, 22 and 23. Since each of the plurality of leaves includes a characteristic reflection point 41, 42 or 43 and therefore a characteristic reflection pattern, the events registered by the converter element 3 may be uniquely assigned. This embodiment has the advantage that a position determination may be carried out for a number of leaves using a single converter element.

Further embodiments of the subject matter described above may be discovered by the person skilled in the art. For example, the surface wave generation shown in FIG. 5 may also be used with little outlay for a number of leaves, for example, by generating a volume wave, which feeds a surface wave over to a leaf at a number of points with mode conversion structure. It is also evident to the person skilled in the art that the subject matter of the present embodiments may be used in a wide variety of forms and for a wide variety of objects during position determination. The objects described above are not restricted to medical engineering but may relate to any physical structures.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. An apparatus for determining a distance, the apparatus comprising:
    a converter element operable to generate an acoustic surface wave;
    a surface operable to feed at least part of the acoustic surface wave to a reflection point; and
    a processor configured to determine a distance between the apparatus and the reflection point from a propagation time of the acoustic surface wave,
    wherein the converter element is operable to register the acoustic surface wave reflected at the reflection point,
    wherein a position of the reflection point relative to an end of a surface having the reflection point is known, and
    wherein the processor is configured to calculate a position of the end from the distance between the apparatus and the reflection point and the position of the reflection point relative to the end.

2. The apparatus as claimed in claim 1, wherein the converter element is an electromechanical converter element.

3. The apparatus as claimed in claim 2, wherein the electromechanical converter element is a piezoelectric interdigital converter.

4. The apparatus as claimed in claim 1, wherein the converter element is operable to generate a volume sound wave and convert the volume sound wave to the acoustic surface wave using mode conversion.

5. The apparatus as claimed in claim 4, wherein the converter element further comprises a piezoelectric thickness mode transducer for generating the volume sound wave.

6. The apparatus as claimed in claim 1, wherein the surface of the apparatus is configured for coupling to the surface having the reflection point for the purposes of feeding over the acoustic surface wave.

7. The apparatus as claimed in claim 6, wherein the surface of the apparatus is provided with a sliding element.

8. The apparatus as claimed in claim 7, wherein the sliding element is grease.

9. The apparatus as claimed in claim 1, wherein the processor is configured to identify a reflection pattern of the acoustic surface wave reflected at a plurality of reflection points that are close to one another in a direction defined by a path of the reflected acoustic surface wave in relation to an extension of the surface having the plurality of reflection points.

10. The apparatus as claimed in claim 1, wherein the surface of the apparatus is operable to feed the acoustic surface wave to a surface of an object, which is configured to move relative to the apparatus.

11. The apparatus as claimed in claim 10, wherein the surface of the apparatus is operable to feed the acoustic surface wave to a plurality of objects.

12. The apparatus as claimed in claim 11, further comprising a plurality of wave splitters disposed one behind another,
    wherein the acoustic surface wave generated in the converter element passes along a path through the plurality of wave splitters, and
    wherein each wave splitter of the plurality of wave splitters diverts part of the acoustic surface wave to be fed to one object of the plurality of objects and allows another part of the acoustic surface wave to pass through.

13. The apparatus as claimed in claim 1, wherein the reflection point comprises a notch.

14. The apparatus as claimed in claim 1, wherein the acoustic surface wave is a Rayleigh wave, a wave in the transition range between Rayleigh waves and Lamb waves, or a Lamb wave.

15. The apparatus as claimed in claim 12, wherein the processor is configured to determine a position of leaves of a multileaf collimator.

16. An apparatus for determining a distance, the apparatus comprising:
    a converter element operable to generate an acoustic surface wave;
    a surface operable to feed at least part of the acoustic surface wave to a reflection point; and
    a processor configured to determine a distance between the apparatus and the reflection point from a propagation time of the acoustic surface wave,
    wherein the converter element is operable to register the acoustic surface wave reflected at the reflection point,
    wherein the converter element is operable to transmit an additional acoustic surface wave along a path within the apparatus, and
    wherein the processor is configured to:
        determine a propagation time of the additional acoustic surface wave for the transmission; and
        determine the distance between the apparatus to the reflection point using the propagation time of the additional acoustic surface wave, a length of the path within the apparatus, and the propagation time of the acoustic surface wave.

17. An apparatus for determining a distance, the apparatus comprising:
    a converter element operable to generate an acoustic surface wave;
    a surface operable to feed at least part of the acoustic surface wave to a reflection point; and
    a processor configured to determine a distance between the apparatus and the reflection point from a propagation time of the acoustic surface wave,
    wherein the converter element is operable to register the acoustic surface wave reflected at the reflection point,
    wherein the converter element is operable to register acoustic surface waves reflected at two different reflection points, and
    wherein the processor is configured to:
        determine a propagation speed of the acoustic surface waves from distances between the apparatus and the reflection points and two propagation times of the reflected acoustic surface waves; and
        use the propagation speed to determine a distance to another reflection point from a propagation time of another acoustic surface wave reflected at the another reflection point.

* * * * *